United States Patent
Buyuktosunoglu et al.

(10) Patent No.: US 10,582,421 B2
(45) Date of Patent: *Mar. 3, 2020

(54) ADAPTIVE NETWORK WITH INTERCONNECTED AUTONOMOUS DEVICES

(71) Applicant: INTERNATIONAL BUSINESS MACHINES CORPORATION, Armonk, NY (US)

(72) Inventors: Alper Buyuktosunoglu, White Plains, NY (US); Pradip Bose, Yorktown Heights, NY (US); Augusto J. Vega, Astoria, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/951,600

(22) Filed: Apr. 12, 2018

(65) Prior Publication Data

US 2018/0242194 A1    Aug. 23, 2018

Related U.S. Application Data

(63) Continuation of application No. 14/868,717, filed on Sep. 29, 2015, now Pat. No. 10,075,875.

(51) Int. Cl.
*H04W 28/08* (2009.01)
*H04W 28/02* (2009.01)
*H04L 12/26* (2006.01)

(52) U.S. Cl.
CPC ............. *H04W 28/08* (2013.01); *H04L 43/16* (2013.01); *H04W 28/0226* (2013.01)

(58) Field of Classification Search
CPC .................................................... H04W 28/08
See application file for complete search history.

(56) References Cited

U.S. PATENT DOCUMENTS

| 7,382,771 B2 | 6/2008 | Leblanc et al. |
| 9,160,497 B2 | 10/2015 | Elliott |

(Continued)

FOREIGN PATENT DOCUMENTS

GB        2501676 A    6/2013

OTHER PUBLICATIONS

List of IBM Patents or Patent Applications Treated as Related; (Appendix P), Filed Apr. 12, 2018; 2 pages.

(Continued)

*Primary Examiner* — Kent Krueger
(74) *Attorney, Agent, or Firm* — Cantor Colburn LLP; Kevin Michael Jordan

(57) ABSTRACT

A computer program product includes a computer readable storage medium having program instructions embodied therewith. The program instructions are executable by a processor to cause the processor to perform a method that includes determining, by a first base station, that the first base station is overloaded with connections from mobile devices. Responsive to the first base station being overloaded, a status update may be received, by the first base station, from each of a plurality of base stations. A second base station may be selected, by the first base station, from among the plurality of base stations. Responsive to the first base station being overloaded, the second base station may be instructed, by the first base station, to relocate from a first position to a new position closer to the first base station. The plurality of base stations automatically relocate to load-balance connections from the plurality of mobile devices.

18 Claims, 4 Drawing Sheets

(56) References Cited

U.S. PATENT DOCUMENTS

| | | | |
|---|---|---|---|
| 9,510,314 | B2 | 11/2016 | Schmidt et al. |
| 9,706,522 | B2 | 7/2017 | Etemad et al. |
| 2010/0142448 | A1 | 6/2010 | Schlicht et al. |
| 2012/0028627 | A1 | 2/2012 | Hunzinger |
| 2013/0289858 | A1 | 10/2013 | Mangiat et al. |
| 2014/0220923 | A1 | 8/2014 | Shoshan et al. |
| 2014/0349704 | A1 | 11/2014 | Xiao et al. |
| 2015/0109338 | A1 | 4/2015 | McKinnon et al. |
| 2015/0236778 | A1 | 8/2015 | Jalali |
| 2015/0327136 | A1 | 11/2015 | Kim et al. |
| 2017/0094558 | A1 | 3/2017 | Buyuktosunoglu et al. |
| 2017/0094559 | A1 | 3/2017 | Buyuktosunoglu et al. |
| 2017/0208512 | A1 | 7/2017 | Aydin et al. |

OTHER PUBLICATIONS

BBC News, [online]; [retrieved on Sep. 29, 2015]; retrieved from the Internet http://www.bbc.com/news/technology-26784438. Wakefield., "Facebook drones to offer low-cost net access", 2014, 4 pgs.

BBC News, [online]; [retrieved on Sep. 29, 2015]; retrieved from the Internet http://www.bbc.com/news/technology-26784438. "Google buys solar-powered drone maker Titan Aerospace", 2014, 8 pgs.

Chung et al., "Traffic distribution schemes for multi-homed mobile hotspots." Vehicular Technology Conference, 2005. VTC 2005-Spring. 2005 IEEE 61st. vol. 4. IEEE, 2005; 5 pgs.

Fitton et al.,. "The future of mobile devices: security and mobility." Lancaster University (2014); 34 pgs.

IEEE Spectrum, [online]; [retrieved on Sep. 29, 2015]; retrieved from the Internet http://spectrum.ieee.org/telecom/wireless/crowdmap. Anderson., "Crowd-mapping With Cell Phones", 2013, 5 pgs.

Orfanus et al. "Self-organizing relay network supporting remotely deployed sensor nodes in military operations." Ultra Modem Telecommunications and Control Systems and Workshops (ICUMT), 2014 6th International Congress on IEEE, 2014; 8 pgs.

Pack et al. "Mobility management in mobile hotspots with heterogeneous multihop wireless links." Communications Magazine, IEEE 45.9 (2007): 106-112.

Rone et al., "Mapping, localization and motion planning in mobile multi-robotic systems." Robotica 31.01 (2013): 1-23.

UBM Electronics, [online]; [retrieved on Sep. 29, 2015]; retrieved from the Internet http://www.eetimes.com/document.asp?doc_id=1321979. Fogarty., "DARPA Turning Drones Into WiFi Hotspots", 2014, 3 pgs.

Van Den Bossche et al. "Autonomic microcell assignment in massively distributed online virtual environments." Journal of Network and Computer Applications 32.6 (2009): 1242-1256.

ADAPTIVE NETWORK WITH INTERCONNECTED AUTONOMOUS DEVICES

DOMESTIC PRIORITY

This application is a continuation of U.S. patent application Ser. No. 14/868,717, entitled "ADAPTIVE NETWORK WITH INTERCONNECTED AUTONOMOUS DEVICES," filed Sep. 29, 2015, the entire contents of which are incorporated herein by reference.

STATEMENT OF GOVERNMENT INTEREST

This invention was made with Government support under Contract No.: HR0011-13-C-0022 awarded by the Defense Advanced Research Projects Agency (DARPA). The Government has certain rights in this invention.

BACKGROUND

Embodiments of the present invention relate to network connectivity and, more specifically, to an adaptive network with interconnected autonomous devices.

Cellular access has increased in demand and is provided through a static network of antennas. There is a risk that an antenna will receive too many connections, especially when the geographical area around that antenna is densely populated. In that case, there can be high activity at the antenna, and quality of service (e.g., speed) will likely suffer as a result of the antenna's bandwidth being fully used. To avoid circumstances where connections suffer due to population density or other reasons, service providers generally over-provision antennas to ensure there is enough bandwidth to service all users.

SUMMARY

According to an embodiment of this disclosure, a computer-implemented method includes determining, by a first base station, that the first base station is overloaded with connections from one or more mobile devices. Responsive to the first base station being overloaded, a status update may be received, by the first base station, from each of a plurality of base stations, where each base station in the plurality of base stations is configured to provide connections to a plurality of mobile devices. Responsive to the first base station being overloaded, a second base station may be selected, by a computer processor of the first base station, from among the plurality of base stations. The second base station is located at a first position. Responsive to the first base station being overloaded, the second base station may be instructed, by the first base station, to relocate from the first position to a new position closer to the first base station. The plurality of base stations automatically relocate to load balance connections from the plurality of mobile devices.

In another embodiment, a system includes a first base station, which includes a memory having computer readable instructions and one or more processors for executing the computer readable instructions. The computer readable instructions include determining, by the first base station, that the first base station is overloaded with connections from one or more mobile devices. Further according to the computer readable instructions, and responsive to the first base station being overloaded, a status update may be received, by the first base station, from each of a plurality of base stations, where each base station in the plurality of base stations is configured to provide connections to a plurality of mobile devices. Responsive to the first base station being overloaded, a second base station may be selected, by the first base station, from among the plurality of base stations. The second base station is located at a first position. Responsive to the first base station being overloaded, the second base station may be instructed, by the first base station, to relocate from the first position to a new position closer to the first base station. The plurality of base stations automatically relocate to load balance connections from the plurality of mobile devices.

In yet another embodiment, a computer program product for load-balancing a network of base stations includes a computer readable storage medium having program instructions embodied therewith. The program instructions are executable by a processor to cause the processor to perform a method. The method includes determining, by a first base station, that the first base station is overloaded with connections from one or more mobile devices. Further according to the method, and responsive to the first base station being overloaded, a status update may be received, by the first base station, from each of a plurality of base stations, where each base station in the plurality of base stations is configured to provide connections to a plurality of mobile devices. Responsive to the first base station being overloaded, a second base station may be selected, by the first base station, from among the plurality of base stations. The second base station is located at a first position. Responsive to the first base station being overloaded, the second base station may be instructed, by the first base station, to relocate from the first position to a new position closer to the first base station. The plurality of base stations automatically relocate to load balance connections from the plurality of mobile devices.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Cellular access has increased in demand, but that demand varies over time within a geographical location. For instance, a location that attracts summer tourists may have low demand for connectivity during winter months. To ensure appropriate speed and connectivity, a service provider will generally over-provision antennas in a geographical location, such that acceptable service is provided at most or all times. However, this can be expensive in terms of both materials and labor.

Some embodiments of the present load-balancing system address this problem by providing antennas as part of mobile base stations, which may automatically and autonomously adapt to changing conditions to balance the load of connected devices.

Figure 1:
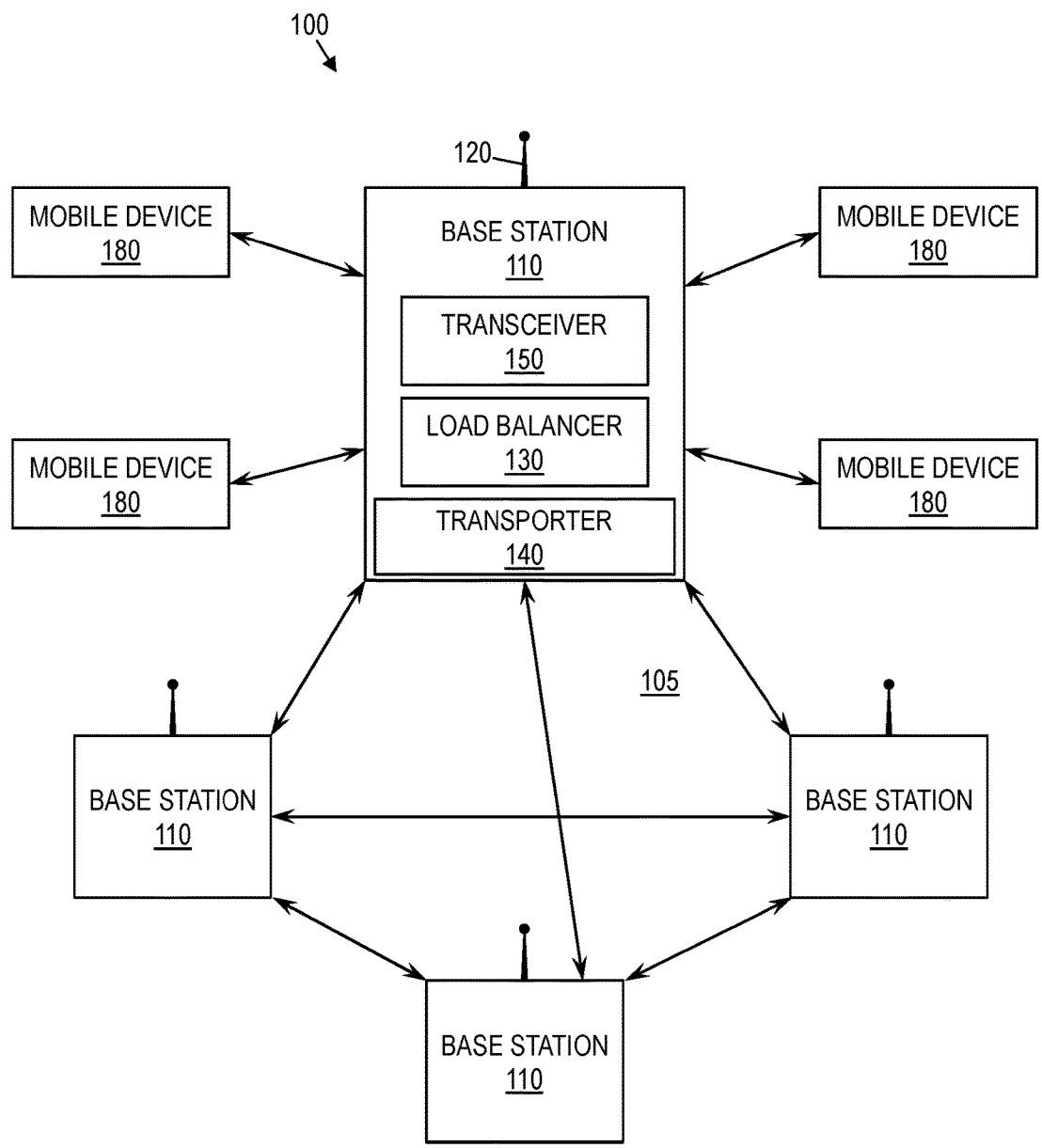
FIG. 1 is a diagram of a load-balancing system, according to some embodiments of this disclosure.

FIG. 1 is a diagram of a load-balancing system 100, according to some embodiments of this disclosure. As shown the load-balancing system 100 may include two or more base stations 110, also referred to herein as standard base stations 110. Each base station 110 may include at least one antenna 120, a load balancer 130, a transporter 140, and a transceiver 150. Generally, the antenna 120 receives connections from one or more mobile devices 180, the load balancer 130 makes decisions about when and where to relocate, the transporter 140 provides a mechanism for physical relocation, and the transceiver 150 communicates with one or more other base stations 110 to enable the performance of load-balancing among the various base stations 110. Together, the base stations 110 may provide a network 105 to which the mobile devices 180 can connect for wireless communications.

The antenna 120 may provide various types of communication to the mobile devices 180, depending on implementation. For example, and not by way of limitation, the antenna 120 may provide cellular communication, radio communication, or broadband communication. Further, in some embodiments, the transceiver 150 may be integrated into the antenna 120, and need not be a distinct component.

As mentioned above the transporter 140 provides a mechanism for physical relocation of the base station 110. For example, and not by way of limitation, the base station 110 may be an unmanned aerial vehicle (UAV) (e.g., a drone), a ground vehicle, a water vehicle, or an underwater vehicle. It will be understood that the type of transporter 140 used may depend on the type of physical relocation being used. For instance, in the case of a UAV, the transporter 140 may include wings and an engine, while in the case of a ground vehicle, the transporter 140 may include wheels and an engine. In the case of a UAV or other aerial-capable base station 110, a base station 110 may or may not rest on the ground when not in the act of relocating. In some embodiments, the base station 110 may remain in the air, hovering above the ground when not relocating. Further, in some embodiments, regardless of the type of transporter 140 used, the base station 110 may be unmanned.

Each base station 110 may autonomously decide whether it is overloaded and, if so, may communicate with other base stations 110 via the transceiver 150 to request that another base station 110 relocate to better balance connections from the mobile devices 180.

Figure 2:
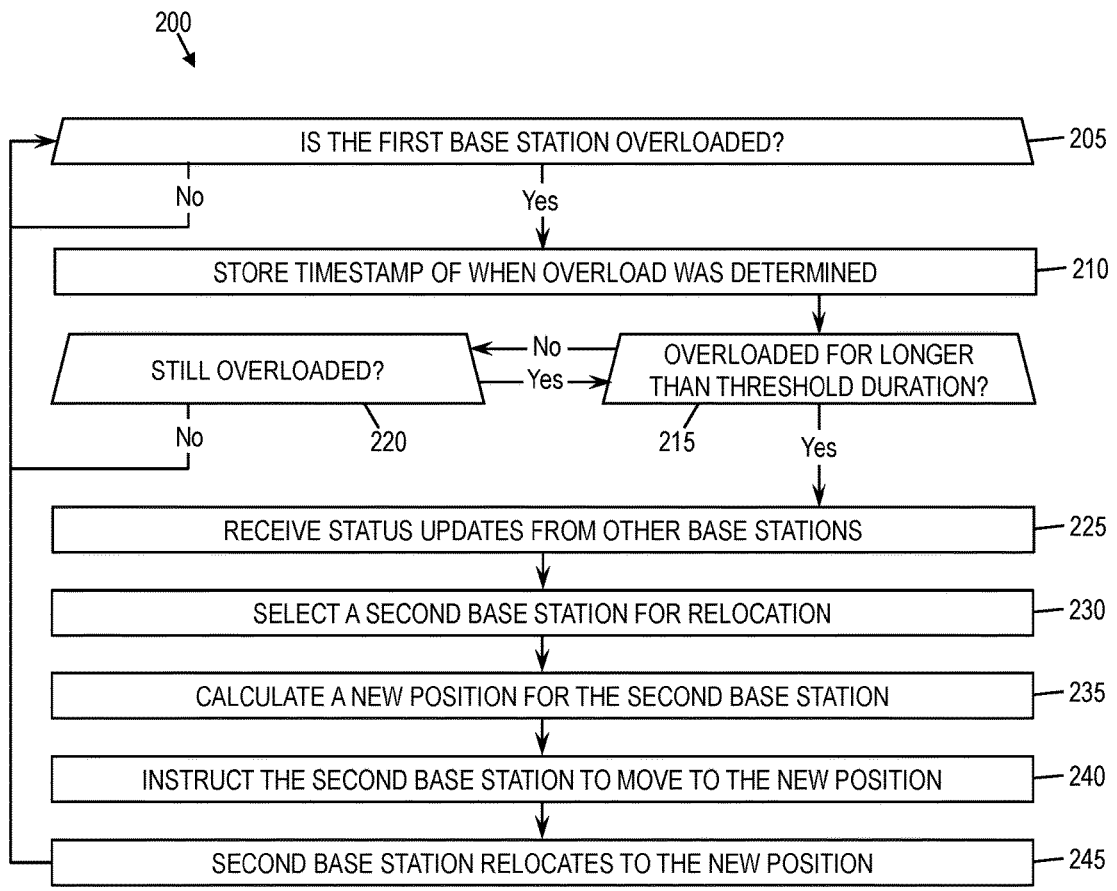
FIG. 2 is a flow diagram of a load-balancing method performed by a base station, according to some embodiments of this disclosure.

More specifically, FIG. 2 is a flow diagram of a load-balancing method 200 performed by a first base station 110 to balance the connections. It will be understood that, although the following description refers to a first base station 110, each of the base stations 110 may autonomously perform this method 200.

As shown, at decision block 205, the first base station 110 may determine whether it is overloaded. To this end, each base station 110 may have a threshold count, which defines how many connection it can handle without being deemed overloaded. In some embodiments, the threshold counts may vary across base stations 110, such that not every base station 110 has the same threshold count. To determine whether the first base station 110 is overloaded, that first base station 110 may determine whether the number of mobile devices 180 connected to the first base station 110 is greater than the threshold count for the first base station 110.

If the first base station's connection count (i.e., the number of mobile devices 180 connected to the first base station 110) does not exceed the threshold count, then the first base station 110 may be deemed not overloaded. In that case, the method 200 may repeat comparing the connection count to the threshold count at block 205, until it determines that the first base station 110 is overloaded.

However, if the number of connections exceeds the threshold count, then the first base station 110 may be deemed overloaded. In that case, at block 210, the first base station 110 may store a timestamp corresponding to the time at which the overload was determined. At decision block 215, the first base station 110 may determine whether it has been overloaded for longer than a threshold duration. As with the threshold count, the threshold duration may vary from one base station 110 to another. To determine whether the threshold duration is exceeded, the first base station 110 may calculate the overload period, which is the difference between the current time and the timestamp. If that overload period exceeds the threshold duration, then the first base station 110 has been overloaded for longer than the threshold duration.

If it is determined at decision block 215 that the first base station 110 has not yet been overloaded for the threshold duration, then the method 200 may move to decision block 220 to determine whether the first base station 110 is still overloaded. The determination at decision block 220 may be the same or similar to the determination made at decision block 205, in that the first base station 110 may determine whether it is overloaded, based on determining whether its connection count exceeds the threshold count. If the first base station 110 is no longer overloaded, then the method 200 may return to decision block 205 to continue checking for an overload. If the first base station 110 is still overloaded, then the method 200 may loop between decision blocks 215 and 220 until either the first base station 110 is no longer overloaded, in which case the method 220 may return to decision block 205, or the overload period exceeds the threshold duration.

If it is determined at decision block 215 that the first base station 110 has been overloaded for a time exceeding the overload duration, then the method 200 may continue to block 225.

In some embodiments, the first base station 110 takes an action to adapt the network 105 by load-balancing only when the first base station 110 has been overloaded for a time period exceeding the threshold duration. On a higher level, in some embodiments, the network 105 adapts with the relocation of one or more base stations 110 only when at least one base station 110 within the network 105 has been overloaded for a duration exceeding its threshold duration.

Thus, at block 225, when the threshold duration is exceeded, the first base station 110 may receive status updates from one or more other base stations 110. In some embodiments, the first base station 110 receives the status updates of, for example, all other base stations 110, all other base stations 110 with which the first base station 110 is able to communicate, or all the other base stations 110 within a predetermined physical distance of the first base station 110.

As discussed above, each base station 110 may include a transceiver 150, which may be, for example, a radio transceiver 150 configured to transmit and receive data from the transceivers 150 of other base stations 110. To receive the status updates of other base stations 110, the first base station 110 may communicate, via its transceiver 150, a request to the other base stations 110 for their statuses. Upon receiving this request, each other base station 110 may transmits its status to the first base station 110 as a status update.

A status from another base station 110 may include, for example, the current connection count of the other base station 110, a geographic location of the other base station 110, an underuse threshold, or a combination of these and other data about the other base station 110. The underuse threshold may be an integer value corresponding to the number of connections to the other base station 110 deemed to be a low number of connections. Generally, if the other base station's connection count is below the underuse threshold, the other base station 110 may be among the top candidates to be relocated for the purpose of load-balancing.

In some embodiments, all base stations 110 have the same underuse threshold, and in that case, the underuse threshold need not be transmitted as part of a base station's status. However, in some other embodiments, the underuse thresholds may vary across the base stations 110. Further, data that has not changed since the last communication of a status update from a base station 110 to the requesting first base station 110 need not be transmitted as part of the status update.

Based on the status updates received, the first base station 110 may have access to other base stations' connection counts and locations. The first base station 110 may thus calculate the physical distance from the first base station 110 to each other base station 110. At block 230, the first base station 110 may select a second base station 110 to relocate. In some embodiments, the base station 110 selected as the second base station 110 is the closest base station 110, based on physical distance, with a connection count lower than its respective underuse threshold.

At block 235, the first base station 110 may calculate a new position for the second base station 110. The new position may be a geographical location. For example, in some embodiments, the new position is a location halfway between the location of the first base station 110 and the location of the second base station 110. At block 240, the first base station 110 may instruct the second base station 110 to relocate to the new position. In some embodiments, this instruction must be approved by a human operator, before the second base station 110 relocates, but this human approval need not be required in other embodiments. At block 245, the second base station 110 may relocate to the new position.

In some cases, the second base station cannot be relocated to the calculated new position, for example, due to weather conditions or other reasons. In such cases, the first base station 110 may select an alternate second base station 110, and may continue selecting alternates until identifying a second base station 110 that can be moved to the new position calculated for it. That second base station 110 may be moved instead of the one originally selected.

The method 200 may then return to block 205, where the first base station 110 may once again determine whether it is overloaded, with the second base station 110 in its new position. The method 200 may continue as long as load balancing between the base stations 110 is desired.

Using this method 200 or a variation of the method 200, the load-balancing system 100 may balance connections across the base stations 110. When the second base station 110 moves closer to the first base station 110, as described above, some of the mobile devices 180 connected the first base station 110 may then be able to connect to the second base station 110. As a result, the first base station's load of connections may be reduced, potentially resulting in a better balance of connections throughout the network 105.

In addition to handling load-balancing when all base stations 110 are operational, the load-balancing system 100 may also automatically adjust to situations in which one or more base stations 110 have failed or are failing. To this end, each base station 110 may be able to adjust its own threshold count, and in some embodiments, each base station 110 may be able to adjust the threshold counts of other base stations 110.

If a first base station 110 detects that it is operating unacceptably, or failing, the first base station 110 may reduce its threshold count. As a result, a lower number of connections to the first base station 110 may prompt relocations of one or more other base stations 110 to bring them closer to the first base station 110, and thus to accept connections from mobile devices 180 previously connected to the first base station 110. Further, if the base station 110 detects that it has failed, the first base station 110 may lower its threshold count to zero, thus causing the first base station 110 to prompt one or more other base stations 110 to move closer to it. More generally, the first base station 110 may adjust its threshold count to reflect its capability of servicing connections, such that reducing or increasing the threshold count may represent, respectively, reduced or increased capability of servicing connections from mobile devices 180.

In some circumstances, the first base station 110 may fail so completely that it is unable to accept connections or to communicate with other base stations 110. In that case, using the above method 200 or a variation of it, the network 105 may automatically adjust. For instance, base stations 110 nearby the first base station 110 will likely become overloaded, and may thus use the method 200 to instruct one or more other base stations 110 to move closer. Being out of communication, the first base station 110 would not be selected as a base station 110 to move closer to the overloaded base stations 110. Thus, the first base station 110 may effectively be ignored as an option for load-balancing, and the network 105 may reform as if the first base station 110 did not exist.

Figure 3:
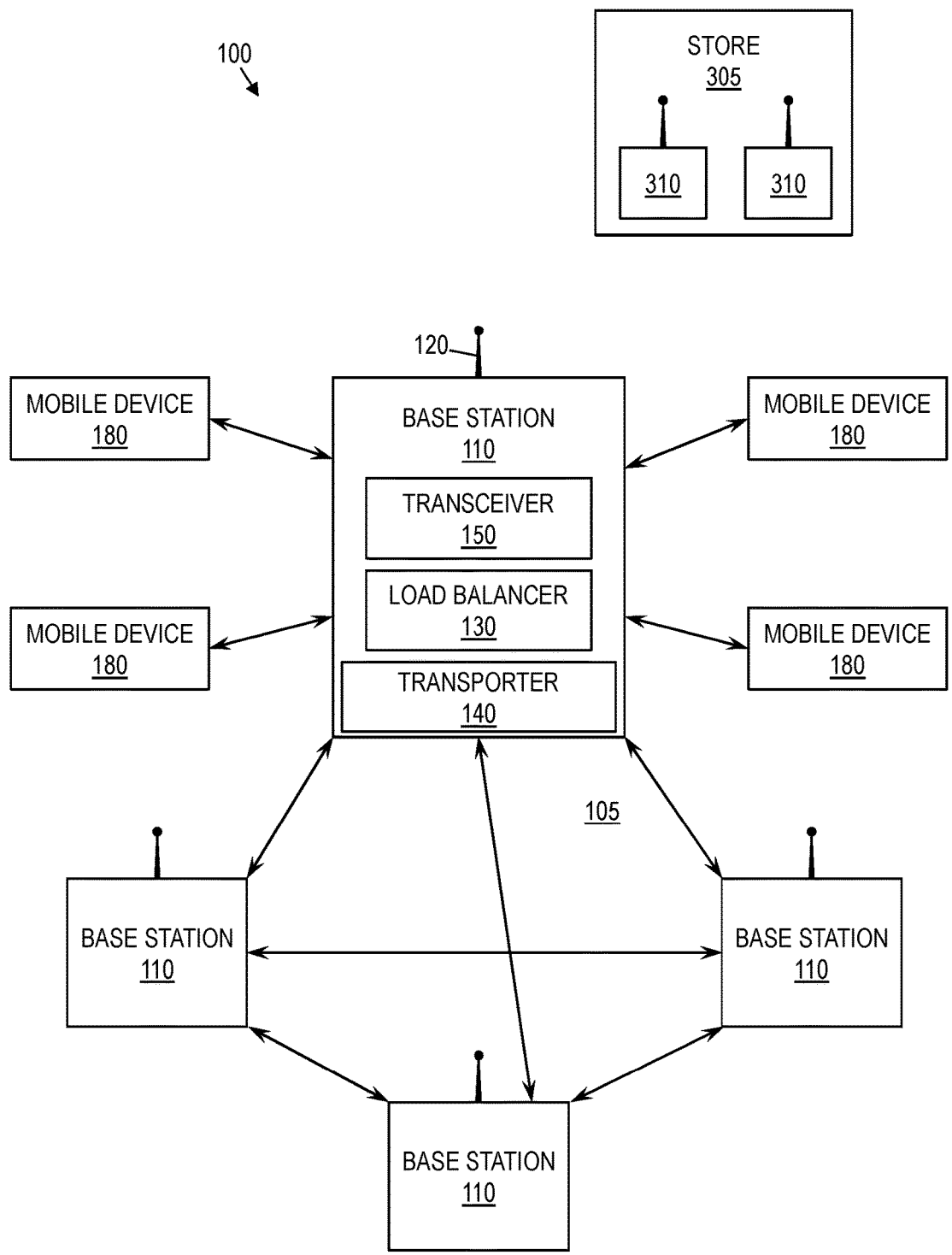
FIG. 3 is a second diagram of the load-balancing system, according to some embodiments of this disclosure.

FIG. 3 is a second diagram of the load-balancing system 100, according to some embodiments of this disclosure. As shown, some embodiments of the load-balancing system 100 include, in addition to the components illustrated in FIG. 1, one or more stores 305 of one or more spare base stations 310. Each store 305 may be a location or facility at which the spare base stations 310 are stored. For example, a store 305 may be a facility for maintaining base stations 310, or a store 305 may have no physical structure but may simply be a position in which a spare base station 310 is located at the moment.

Each spare base station 310 may contain the components discussed above as being incorporated in, or associated with, a standard base station 110. However, each spare base station 310 may have an active and an inactive mode, one of which is in effect at a given moment. In some embodiments, when in their inactive modes, spare base stations 310 are not available for relocating at the instruction of the standard base stations 110, and are not available to accept connections from mobile devices 180.

A spare base station 310 may become active if its activation conditions are met. In some embodiments, a spare base station 310 may periodically poll the standard base stations 110, which may provide status updates upon request from the spare base station 310. In some embodiments, the standard base stations 110 polled may only be those that are within a predetermined physical distance of the spare base station 310, while in other embodiments, the spare base stations 310 may poll all standard base stations.

If the spare base station 310 determines that its activation conditions are met, then the spare base station 310 may activate itself, thus switching from the inactive mode to the active mode. Generally, the activation conditions may reflect circumstances under which the network 105, or a local portion of the network 105, is deemed to be overloaded. For example, and not by way of limitation, the activation conditions may require that the count of standard base stations 110 that are overloaded exceeds a predetermined overloaded threshold for the spare base station 310. When active, the spare base station 310 behaves as a standard base station 110, and is thus available to accept connections from mobile devices 180 and for relocations to load-balance the network 105.

Figure 4:
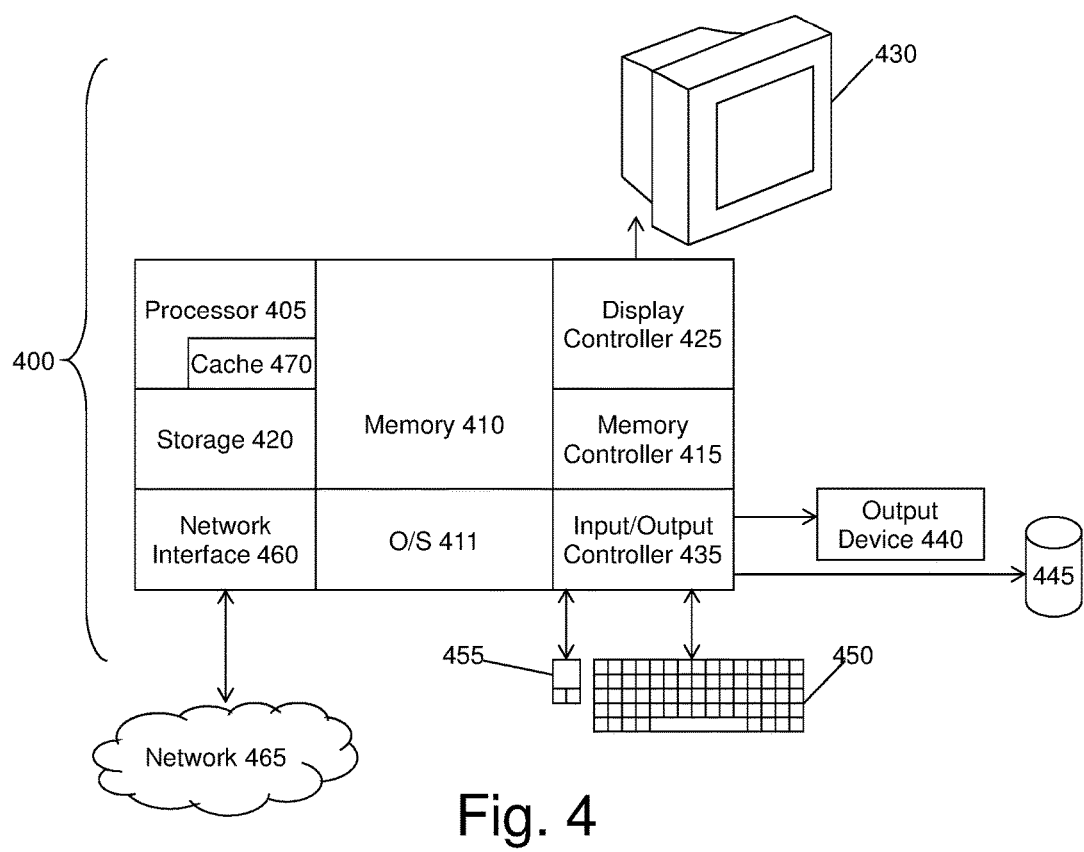
FIG. 4 is a block diagram of a computer system for implementing some or all aspects of the load-balancing system, according to some embodiments of this disclosure.

FIG. 4 illustrates a block diagram of a computer system 400 for use in implementing a load-balancing system or method according to some embodiments. The load-balancing systems and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer. For example, each base station 410 may be a computer system 400, such the one illustrated in FIG. 4, for determining whether and how to perform relocations to load-balance the network 405.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the load-balancing systems and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Load-balancing systems and methods according to this disclosure may be embodied, in whole or in part, in computer program products or in computer systems 400, such as that illustrated in FIG. 4.

Technical effects and benefits of some embodiments include the ability to load-balance a network 105 formed by mobile base stations 110 and, in some cases, spare base stations 310. When some embodiments are used by a service provider, the service provider need not over-provision base stations 110 to ensure acceptable service. Rather, the service provider may provide a lesser number of base stations 110, where the base stations 110 autonomously adapt to load-balance connections.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising a first base station, the first base station comprising:
    a memory having computer readable instructions; and
    one or more processors for executing the computer readable instructions, the computer readable instructions comprising:
        determining autonomously, by the first base station, that the first base station is overloaded with connections from one or more mobile devices; and
        responsive to the first base station being overloaded:
            requesting, by the first base station that is overloaded, a plurality of status updates from a plurality of base stations, each base station in the plurality of base stations configured to provide connections to a plurality of mobile devices;
            receiving, by the first base station that is overloaded, the plurality of status updates comprising a respective status update from each of the plurality of base stations;
            identifying, by the first base station that is overloaded, based on the plurality of status updates, a second base station that is underused;
            selecting, by the first base station that is overloaded, based at least in part on the second base station being underused, the second base station from among the plurality of base stations, wherein the second base station is located at a first position; and
            instructing, by the first base station that is overloaded, the second base station to relocate from the first position to a new position closer to the first base station;
        wherein the plurality of base stations automatically relocate to load-balance connections from the plurality of mobile devices.

2. The system of claim 1, wherein each of the plurality of base stations comprises a transportation mechanism, and wherein each of the plurality of base stations is configured to instruct other base stations in the plurality of base stations to relocate.

3. The system of claim 2, wherein the first base station is at least one of an unmanned aerial vehicle, an unmanned ground vehicle, an unmanned water vehicle, and an unmanned underwater vehicle.

4. The system of claim 1, wherein selecting the second base station from among the plurality of base stations further comprises automatically ignoring a failed base station among the plurality of base stations.

5. The system of claim 1, wherein the determining that the first base station is overloaded comprises:
    detecting, by the first base station, that a connection count of the first base station exceeds a threshold count; and
    modifying the threshold count based on a capability of the first base station to service connections to the plurality of mobile devices.

6. The system of claim 1, the computer readable instructions further comprising:
    communicating, by the first base station that is overloaded, a status update to a spare base station;
    wherein the spare base station activates itself responsive to detecting an overload in a network formed by the plurality of base stations.

7. A computer program product for load-balancing a network of base stations, the computer program product comprising a computer readable storage medium having program instructions embodied therewith, the program instructions executable by a processor to cause the processor to perform a method comprising:
    determining autonomously, by a first base station, that the first base station is overloaded with connections from one or more mobile devices; and
    responsive to the first base station being overloaded:
        requesting, by the first base station that is overloaded, a plurality of status updates from a plurality of base stations, each base station in the plurality of base stations configured to provide connections to a plurality of mobile devices;
        receiving, by the first base station that is overloaded, the plurality of status updates comprising a respective status update from each of the plurality of base stations;
        identifying, by the first base station that is overloaded, based on the plurality of status updates, a second base station that is underused;
        selecting, by the first base station that is overloaded, based at least in part on the second base station being underused, the second base station from among the plurality of base stations, wherein the second base station is located at a first position; and
        instructing, by the first base station that is overloaded, the second base station to relocate from the first position to a new position closer to the first base station;
    wherein the plurality of base stations automatically relocate to load-balance connections from the plurality of mobile devices.

8. The computer program product of claim 7, wherein each of the plurality of base stations comprises a transportation mechanism, and wherein each of the plurality of base stations is configured to instruct other base stations in the plurality of base stations to relocate.

9. The computer program product of claim 8, wherein the first base station is at least one of an unmanned aerial vehicle, an unmanned ground vehicle, an unmanned water vehicle, and an unmanned underwater vehicle.

10. The computer program product of claim 7, wherein selecting the second base station from among the plurality of base stations further comprises automatically ignoring a failed base station among the plurality of base stations.

11. The computer program product of claim 7, wherein the determining that the first base station is overloaded comprises:
   detecting, by the first base station, that a connection count of the first base station exceeds a threshold count; and
   modifying the threshold count based on a capability of the first base station to service connections to the plurality of mobile devices.

12. The computer program product of claim 7, the method further comprising:
   communicating, by the first base station that is overloaded, a status update to a spare base station;
   wherein the spare base station activates itself responsive to detecting an overload in a network formed by the plurality of base stations.

13. A computer-implemented method comprising:
   determining autonomously, by a first base station, that the first base station is overloaded with connections from one or more mobile devices; and
   responsive to the first base station being overloaded:
      requesting, by the first base station that is overloaded, a plurality of status updates from a plurality of base stations, each base station in the plurality of base stations configured to provide connections to a plurality of mobile devices;
      receiving, by the first base station that is overloaded, the plurality of status updates comprising a respective status update from each of the plurality of base stations;
      identifying, by the first base station that is overloaded, based on the plurality of status updates, a second base station that is underused;
      selecting, by the first base station that is overloaded, based at least in part on the second base station being underused, the second base station from among the plurality of base stations, wherein the second base station is located at a first position; and
      instructing, by the first base station that is overloaded, the second base station to relocate from the first position to a new position closer to the first base station;
   wherein the plurality of base stations automatically relocate to load-balance connections from the plurality of mobile devices.

14. The computer-implemented method of claim 13, wherein each of the plurality of base stations comprises a transportation mechanism, and wherein each of the plurality of base stations is configured to instruct other base stations in the plurality of base stations to relocate.

15. The computer-implemented method of claim 14, wherein the first base station is at least one of an unmanned aerial vehicle, an unmanned ground vehicle, an unmanned water vehicle, and an unmanned underwater vehicle.

16. The computer-implemented method of claim 13, wherein selecting the second base station from among the plurality of base stations further comprises automatically ignoring a failed base station among the plurality of base stations.

17. The computer-implemented method of claim 13, wherein the determining that the first base station is overloaded comprises:
   detecting, by the first base station, that a connection count of the first base station exceeds a threshold count; and
   modifying the threshold count based on a capability of the first base station to service connections to the plurality of mobile devices.

18. The computer-implemented method of claim 13, further comprising:
   communicating, by the first base station that is overloaded, a status update to a spare base station;
   wherein the spare base station activates itself responsive to detecting an overload in a network formed by the plurality of base stations.

* * * * *